United States Patent
Hotson et al.

(10) Patent No.: US 11,663,807 B2
(45) Date of Patent: May 30, 2023

(54) SYSTEMS AND METHODS FOR IMAGE BASED PERCEPTION

(71) Applicant: Ford Global Technologies, LLC, Dearborn, MI (US)

(72) Inventors: Guy Hotson, Mountain View, CA (US); Francesco Ferroni, Bayern (DE); Harpreet Banvait, Farmington Hills, MI (US); Kiwoo Shin, Mountain View, CA (US); Nicolas Cebron, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/395,003

(22) Filed: Aug. 5, 2021

(65) Prior Publication Data

US 2023/0038578 A1 Feb. 9, 2023

(51) Int. Cl.
| | |
|---|---|
| *G06V 10/26* | (2022.01) |
| *B60W 50/00* | (2006.01) |
| *G06T 7/254* | (2017.01) |
| *G06V 10/75* | (2022.01) |
| *G06V 10/10* | (2022.01) |

(52) U.S. Cl.
CPC .............. *G06V 10/26* (2022.01); *B60W 50/00* (2013.01); *G06T 7/254* (2017.01); *G06V 10/757* (2022.01); *G06T 2207/30241* (2013.01); *G06V 10/16* (2022.01)

(58) Field of Classification Search
CPC ........... G08G 1/096725; G08G 1/0116; G08G 1/0133; G08G 1/0145; G08G 1/04; G08G 1/056; G08G 1/087; G08G 1/096775; G08G 1/0141
See application file for complete search history.

(56) References Cited

U.S. PATENT DOCUMENTS

| | | | |
|---|---|---|---|
| 11,004,233 B1 | 5/2021 | Wang | |
| 2018/0045818 A1* | 2/2018 | Majumdar | .............. G01S 17/42 |
| 2018/0089541 A1* | 3/2018 | Stoop | ................... G06K 9/6277 |

(Continued)

FOREIGN PATENT DOCUMENTS

| | | |
|---|---|---|
| WO | 2017177367 A1 | 10/2017 |
| WO | 2018184963 A2 | 10/2018 |

OTHER PUBLICATIONS

A Self-Calibrating Probabilistic Framework for 3D Environment Perception Using Monocular Vision—2020 (Year: 2020).*

(Continued)

*Primary Examiner* — Nizar N Sivji
(74) *Attorney, Agent, or Firm* — Frank MacKenzie; Brooks Kushman, P.C.

(57) ABSTRACT

Systems and methods for image-based perception. The methods comprise: obtaining, by a computing device, images captured by a plurality of cameras with overlapping fields of view; generating, by the computing device, spatial feature maps indicating locations of features in the images; defining, by the computing device, predicted cuboids at each location of an object in the images based on the spatial feature maps; and assigning, by the computing device, at least two cuboids of said predicted cuboids to a given object when predictions from images captured by separate cameras of the plurality of cameras should be associated with a same detected object.

20 Claims, 10 Drawing Sheets

(56) References Cited

U.S. PATENT DOCUMENTS

| | | | |
|---|---|---|---|
| 2019/0050692 A1 | 2/2019 | Sharma et al. | |
| 2019/0104278 A1* | 4/2019 | Ermilios | G06T 7/223 |
| 2019/0213744 A1* | 7/2019 | Friebe | G06T 7/90 |
| 2019/0289282 A1 | 9/2019 | Briggs et al. | |
| 2020/0003897 A1* | 1/2020 | Shroff | G01S 17/86 |
| 2020/0034627 A1 | 1/2020 | Zhu et al. | |
| 2020/0211375 A1* | 7/2020 | Vig | G08G 1/09623 |
| 2021/0042607 A1* | 2/2021 | Yan | G06T 19/006 |
| 2022/0301099 A1* | 9/2022 | Cebron | G06T 3/0093 |

OTHER PUBLICATIONS

Stabilization and Validation of 3D Object Position Using Multimodal Sensor Fusion and Semantic Segmentation—2020 (Year: 2020).*
Sanatkar, M., "Lidar 3D Odject Detection Methods", Towards Data Science, available at https://towardsdatascience.com/lidar-3d-object-detection-methods-f34cf3227aea.
Dertat, A., "Applied Deep Learning—Part 4: Convolutional Neural Networks", Towards Data Science, available at <https://towardsdatascience.com/applied-deep-learning-part-4-convolutional-neural-networks-584bc134c1e2>.
Wang et al., "Multi-View Adaptive Fusion Network for 3D Object Detection", arvix.org, Cornell University Library, Dec. 8, 2020, XP081830838.
Chen et al., "F-Cooper: Feature based Cooperative Perception for Autonomous Vehicle Edge Computuing System Using 3D Point Clouds", ARXIV.org, Cornell University Library, Sep. 13, 2019, XP081477159.

* cited by examiner

SYSTEMS AND METHODS FOR IMAGE BASED PERCEPTION

BACKGROUND

Statement of the Technical Field

The present disclosure relates generally to image-based machine learning systems. More particularly, the present disclosure relates to implementing systems and methods for feature extraction using multi-camera views to perform perception feature fusion for tasks such as cuboid association.

DESCRIPTION OF THE RELATED ART

Modern day vehicles have at least one on-board computer and have internet/satellite connectivity. The software running on these on-board computers monitor and/or control operations of the vehicles. The vehicle also comprises cameras and LiDAR detectors for detecting objects in proximity thereto. The cameras capture images of the scenes in proximity to the vehicles. The LiDAR detectors generate LiDAR datasets that measure the distance from the vehicle to the objects at a plurality of different times. These images and distance measurements can be used for identifying objects, tracking movements of the object, making predictions as to the object's trajectory, and planning paths of travel for the vehicle based on the predicted objects trajectory.

SUMMARY

The present disclosure concerns implementing systems and methods for image-based feature fusion. The methods comprise: obtaining images captured by a plurality of cameras with overlapping fields of view; generating, by a computing device, spatial feature maps indicating locations of features in the images; defining, by the computing device, predicted cuboids at each location of an object in the images based on the spatial feature maps; assigning, by the computing device, at least two of said predicted cuboids to a given object when predictions from separate cameras should be associated with a same detected object; determining a track for the given object using the predicted cuboids that were associated with the given object; and/or using the track to control autonomous operations of a vehicle.

The spatial feature maps may be generated using a feature extraction module such as a CNN. A determination as to whether two or more predictions from separate cameras should be associated with a same detected object can be made by: using the spatial feature maps to generate a feature embedding for each prediction; determining a first difference between each set of two feature embeddings; determining a second difference between properties of each prediction (e.g., 3D location of amodal cuboids); and comparing the first and second difference respectively to threshold values. A determination can be made that the predictions are to be associated with a same object when the first and second differences are respectively less than the threshold values. A determination can be made that the predicted cuboids of the set are not to be associated with a same object when at least one of the first and second differences is greater than or equal to a respective one of the threshold values.

Implementing systems of the above-described methods for image-based perception and can include, but are not limited to, a processor and a non-transitory computer-readable storage medium comprising programming instructions that are configured to cause the processor to implement a method for image-based perception.

BRIEF DESCRIPTION OF THE DRAWINGS

The present solution will be described with reference to the following drawing figures, in which like numerals represent like items throughout the figures.

DETAILED DESCRIPTION

Figure 1:
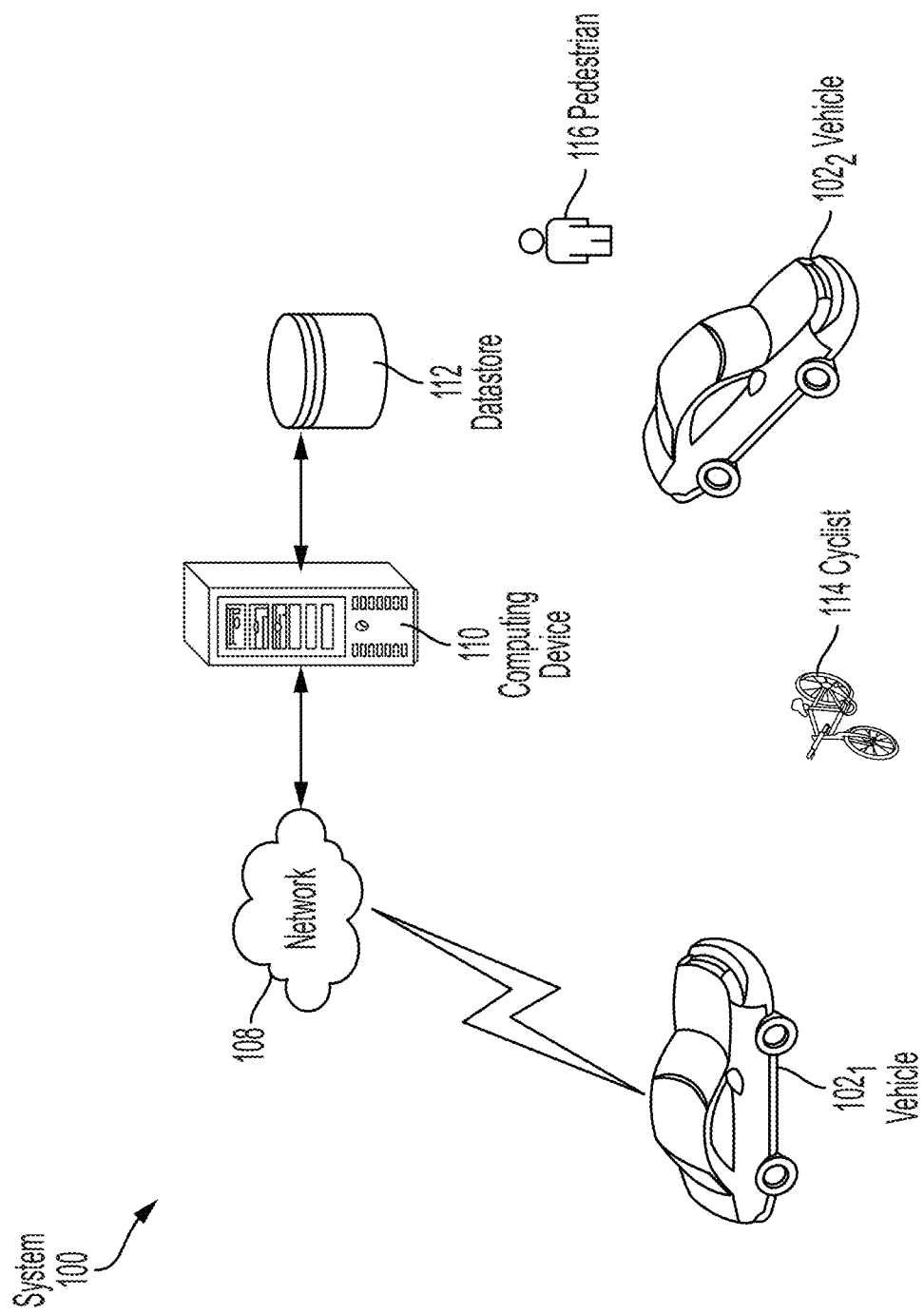
FIG. 1 is an illustration of a system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present solution is described herein in the context of an autonomous vehicle. The present solution is not limited to autonomous vehicle applications. The present solution can be used in other applications such as robotic applications.

The present solution relates to implementing systems and methods for image-based perception. When performing tasks such as image-based perception with cameras having partially overlapping Fields of View (FOV), two challenges arise: (i) how to associate predictions associated with images captured by separate cameras; and (ii) how to leverage two views in a scene. In the scope of autonomous vehicles, challenge (i) can lead to detrimental behavior such as the prediction of multiple actors in a scene for a single object. The present solution addresses challenges (i) and (ii).

In this regard, the methods generally comprise: (i) capturing images using monocular cameras with overlapping FOVs and/or LiDAR datasets from different FOVs; (ii) using the images in a feature extraction module to generate spatial feature maps by applying filters or feature detectors to the images; (iii) optionally fusing the feature maps from the monocular cameras; (iv) using the spatial feature maps to define predictions such as monocular amodal cuboids for each object in the images; (v) optionally associating the predictions from the different feature maps with objects; and (vi) optionally using the predicted cuboids to control autonomous operations of a vehicle.

The term "spatial feature map" as used herein refers to a spatial-relational construct of an object. The spatial feature map is output from a function that converts or otherwise transforms a feature vector in one space (e.g., an image domain) into a feature vector in another space (e.g., a high-dimensional domain). For example, the function can return a spatial feature map comprising [a first detected feature identifier, a first detected feature classification, a first detected feature location in an image, a strength of a link from the first detected feature to a real object, a second feature identifier, a second detected feature classification, a second feature location in an image, a strength of a link from the second detect feature to the real object, . . . ]from an input vector [a first pixel identifier, a first pixel location, a first pixel color, a second pixel identifier, a second pixel location, a second pixel color, . . . ]. Each strength value of the spatial feature map can comprise a probabilistic strength of relation between the feature and a certain detected object (e.g., vehicle, pedestrian, bicycle, dog, etc.) in an image. The present solution is not limited to the particulars of this example.

In some scenarios, operation (iii) involves: identifying overlapping portions of the spatial feature maps; combining the overlapping portions of the spatial feature maps together to generate a combined spatial feature map; and using the combined spatial feature map to define predictions (e.g., semantic segmentation of the scene or a predicted cuboid for each object, where each predicted cuboid comprises an oriented 3D box encompassing a given object in proximity to the vehicle).

In those and/or other scenarios, operation (iii) involves: defining predictions at each location of the spatial feature maps, for example, using an algorithm for classification and regression of 3D coordinates and/or the overlapping portions of spatial feature maps as described above; and optionally performing an additional embedding with weights trained via, for example, a triplet or quadruplet loss algorithm to associate each prediction across cameras with overlapping FOVs based on similarities of visual features thereof.

Illustrative Implementing Systems

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an autonomous vehicle (AV). The AV $102_1$ can include, but is not limited to, a land vehicle (as shown in FIG. 1), an aircraft, a watercraft, a subterrene, or a spacecraft.

AV $102_1$ is generally configured to detect objects $102_2$, 114, 116 and perceive scenes in proximity thereto. The objects can include, but are not limited to, a vehicle $102_2$, a cyclist 114 (such as a rider of a bicycle, electric scooter, motorcycle, or the like) and/or a pedestrian 116. The image-based perception is achieved in accordance with a novel image-based perception process of the present solution. The novel image-based perception process will be described in detail below. The image-based perception process can be performed at the AV $102_1$, at the remote computing device 110, or partially at both the AV $102_1$ and the remote computing device 110. Accordingly, information related to image-based perception may be communicated between the AV and a remote computing device 110 via a network 108 (e.g., the Internet, a cellular network and/or a radio network). The image-based perception related information may also be stored in a datastore 112.

When such an image-based perception is made, AV $102_1$ performs operations to: generate one or more possible object trajectories for the detected object; and analyze at least one of the generated possible object trajectories to determine whether or not there is an undesirable level of probability that a collision will occur between the AV and object if the AV is to follow a given trajectory. If not, the AV $102_1$ is caused to follow the given vehicle trajectory. If so, the AV $102_1$ is caused to (i) follow another vehicle trajectory with a relatively low probability of collision with the object or (ii) perform a maneuver to reduce the probability of collision with the object or avoid collision with the object (e.g., brakes and/or changes direction of travel).

Figure 2:
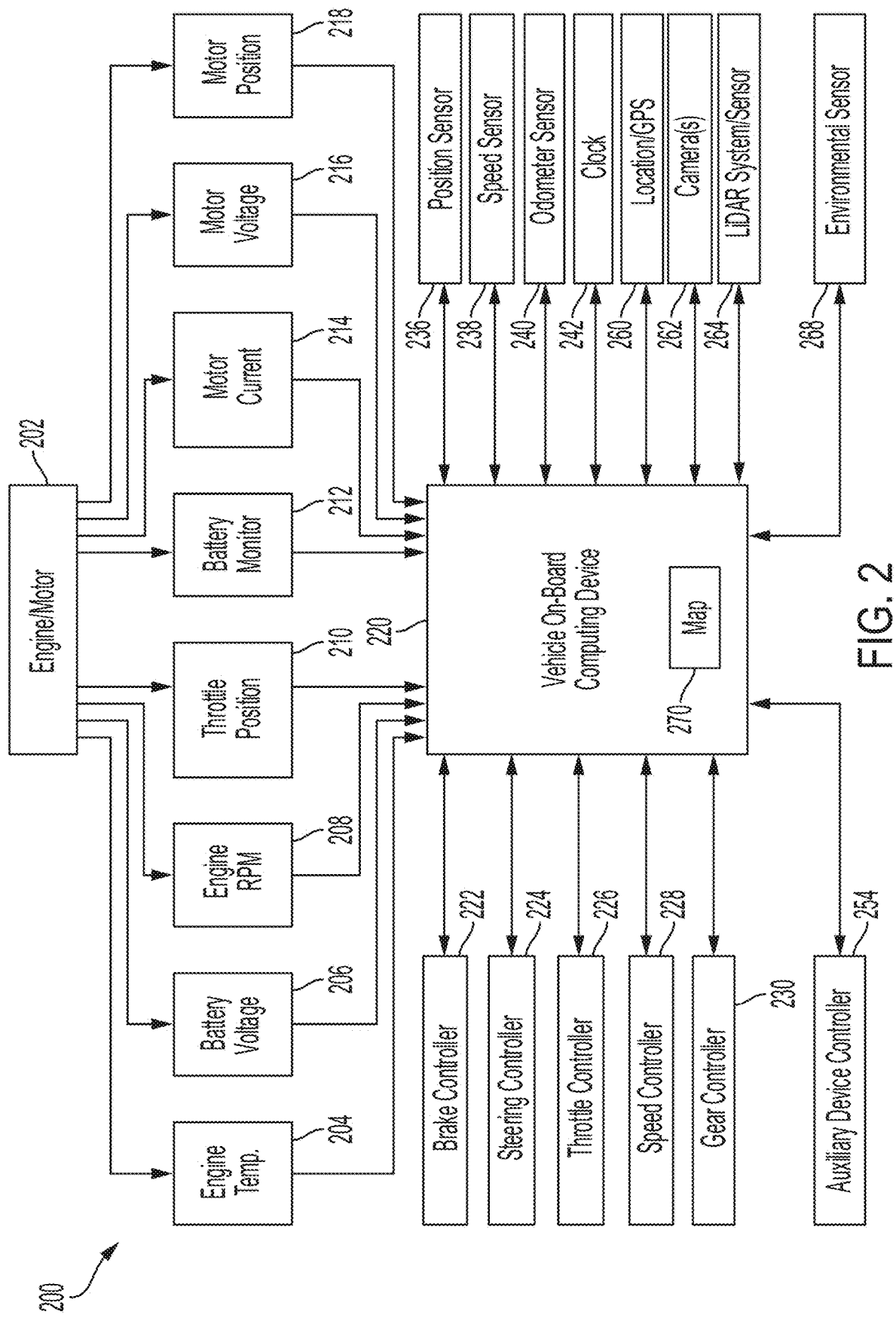
FIG. 2 is an illustration of an architecture for a vehicle.

Referring now to FIG. 2, there is provided an illustration of an illustrative system architecture for a vehicle 200. Vehicles $102_1$ and/or $102_2$ of FIG. 1 can have the same or similar system architecture as that shown in FIG. 2. Thus, the following discussion of vehicle 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); and image-based perception sensors such as one or more cameras 262. The sensors also may include environmental sensors 268 such as a precipitation sensor and/or ambient temperature sensor. The image-based perception sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals.

Captured images are communicated from the cameras 262 to the vehicle on-board computing device 220. The captured images are processed by the vehicle on-board computing device 220 to perceive the scene in proximity to the vehicle 200 in accordance with the novel image-based perception algorithm(s) of the present solution. The novel image-based perception algorithm(s) will be described in detail below.

When the vehicle on-board computing device 220 detects a moving object, the vehicle on-board computing device 220 will generate one or more possible object trajectories for the detected object, and analyze the possible object trajectories to assess the probability of a collision between the object and the AV if the AV was to follow a given vehicle trajectory. If the probability does not exceed the acceptable threshold, then the vehicle on-board computing device 220 may cause the vehicle 200 to follow the given trajectory. If the probability exceeds an acceptable threshold, the vehicle on-board computing device 220 performs operations to: (i) determine an alternative vehicle trajectory and analyze whether the collision can be avoided if the AV follows this alternative vehicle trajectory; or (ii) causes the AV to perform a maneuver (e.g., brake, accelerate, or swerve).

Figure 3:
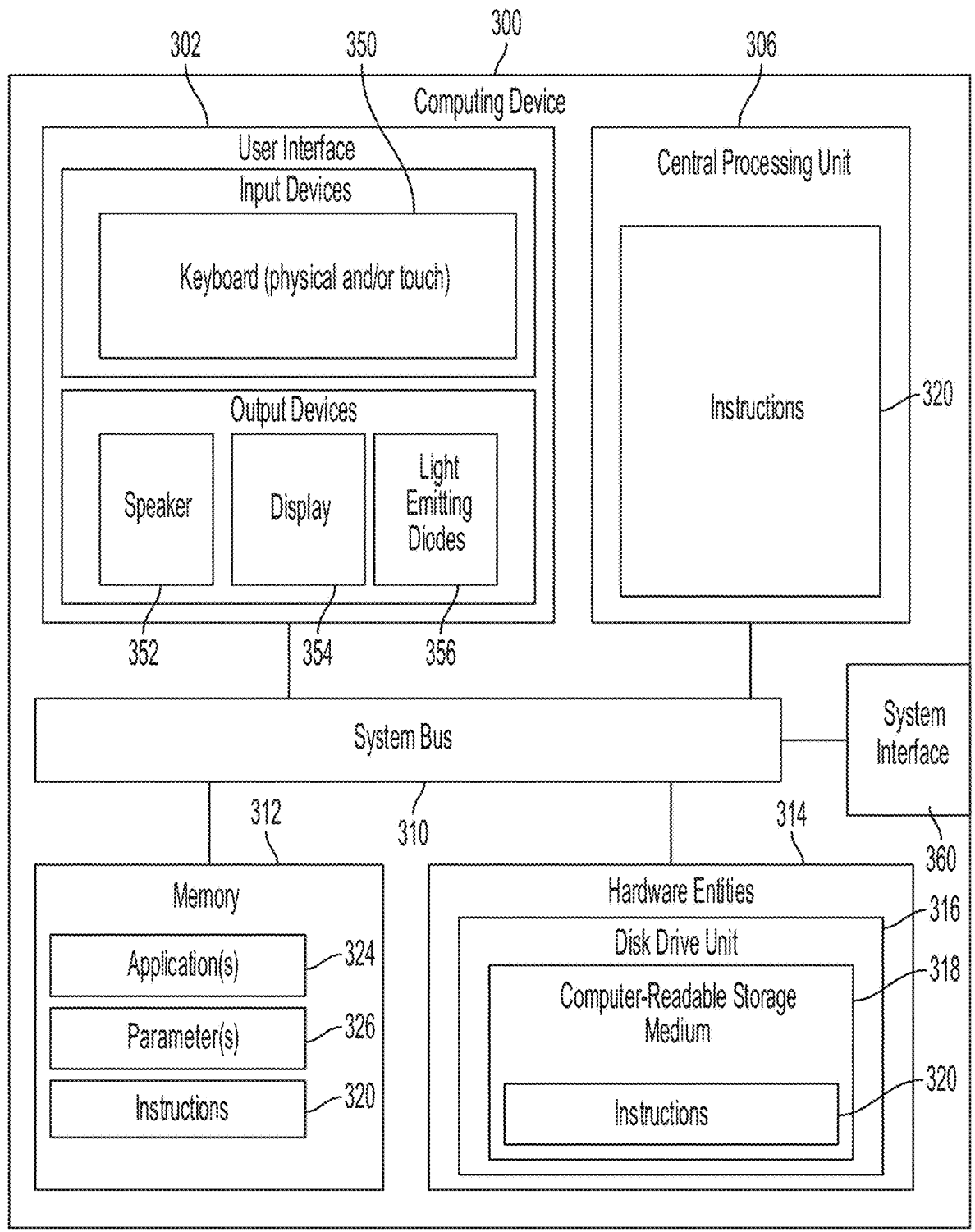
FIG. 3 is an illustration of an architecture for a computing device.

Referring now to FIG. 3, there is provided an illustration of an illustrative architecture for a computing device 300. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
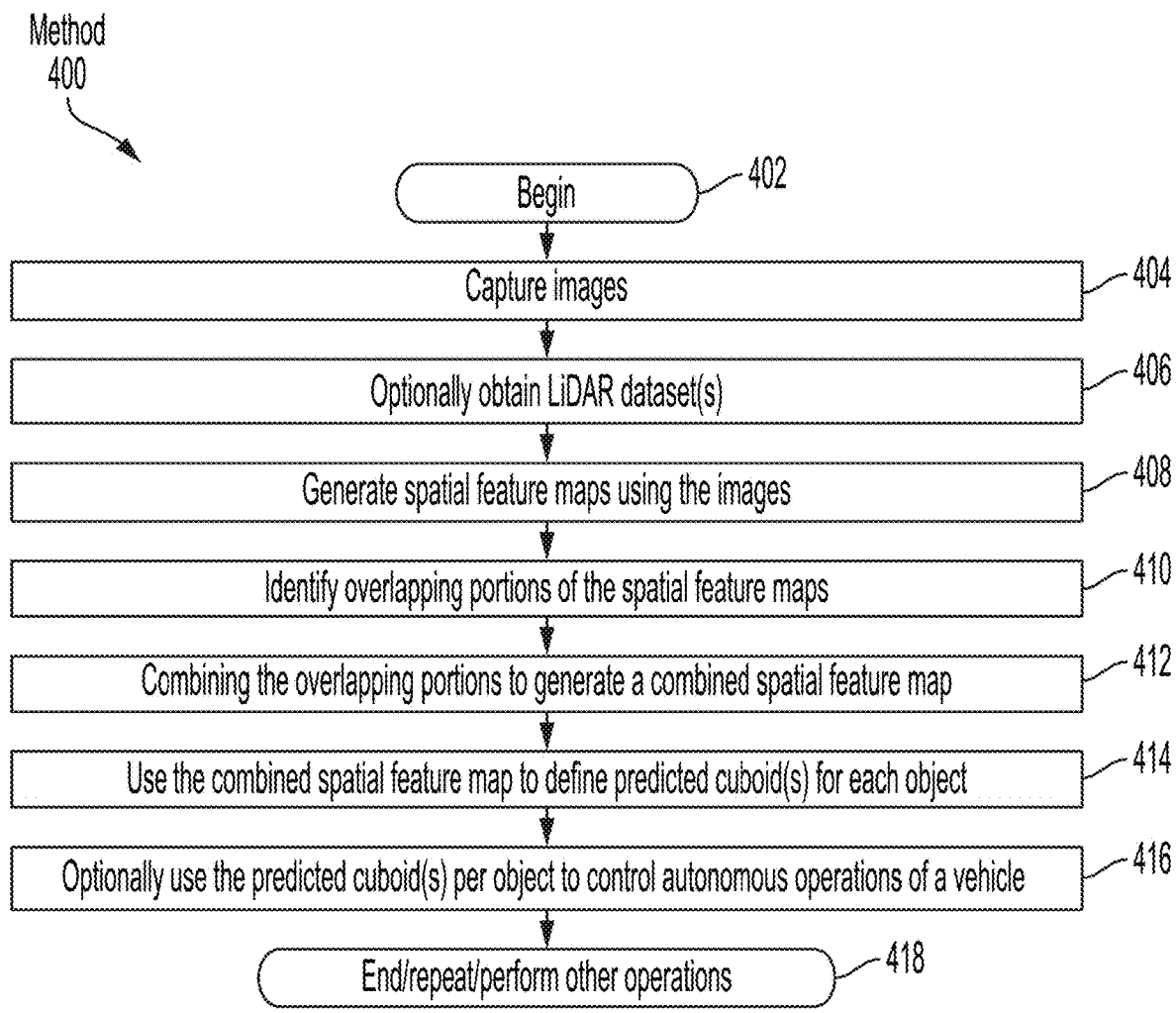
FIG. 4 provides a flow diagram of an illustrative method for image-based perception for predicting 3D cuboids.

Referring now to FIG. 4, there is provided a flow diagram of an illustrative method 400 for image-based perception. In method 400, machine learning techniques (such as CNNs and transformer networks) are used to extract spatial feature maps from images, which are in turn are used to make prediction such as 2D or 3D bounding boxes for objects or per-pixel segmentation. To simultaneously solve the challenges of associating predictions from multiple cameras and leveraging the different perspectives of a given scene, spatial feature maps are combined from the overlapping regions of the different cameras. The combined features are then used to perform the predictions corresponding to the overlapping region. Multiple approaches could be taken for determining the overlapping regions of the feature maps, such as (i) looking at the distance of the extracted features from different cameras and (ii) using the camera calibration in combination with a predicted depth map, LiDAR returns, and/or prior assumptions of where camera rays would intersect given a high definition map. After association, features can be combined by, for example, simply adding them together or by concatenating them.

As shown in FIG. 4, method 400 begins with 402 and continues with 404 where images are captured. The images can be captured by monocular cameras (e.g., cameras 262 of FIG. 2) with overlapping FOVs. The monocular cameras may be deployed on an AV (e.g., AV $102_1$ of FIG. 1). Each image comprises 3 layers (or channels) of information superimposed on each other—a Red (R) layer, a Green (G) layer and a Blue (B) layer. This image may also referred to as an RGB image. The images can be stored in a datastore local to and/or remote from the AV (e.g., datastore 112 of FIG. 1 and/or memory 312 of FIG. 3).

In 406, LiDAR datasets may optionally be obtained by a computing device (e.g., computing device 110 of FIG. 1 and/or the vehicle on-board computing device 220 of FIG. 2). The LiDAR datasets may be generated by a LiDAR system (e.g., LiDAR system 264 of FIG. 2) of the AV. LiDAR datasets and LiDAR system are well known.

Figure 5:
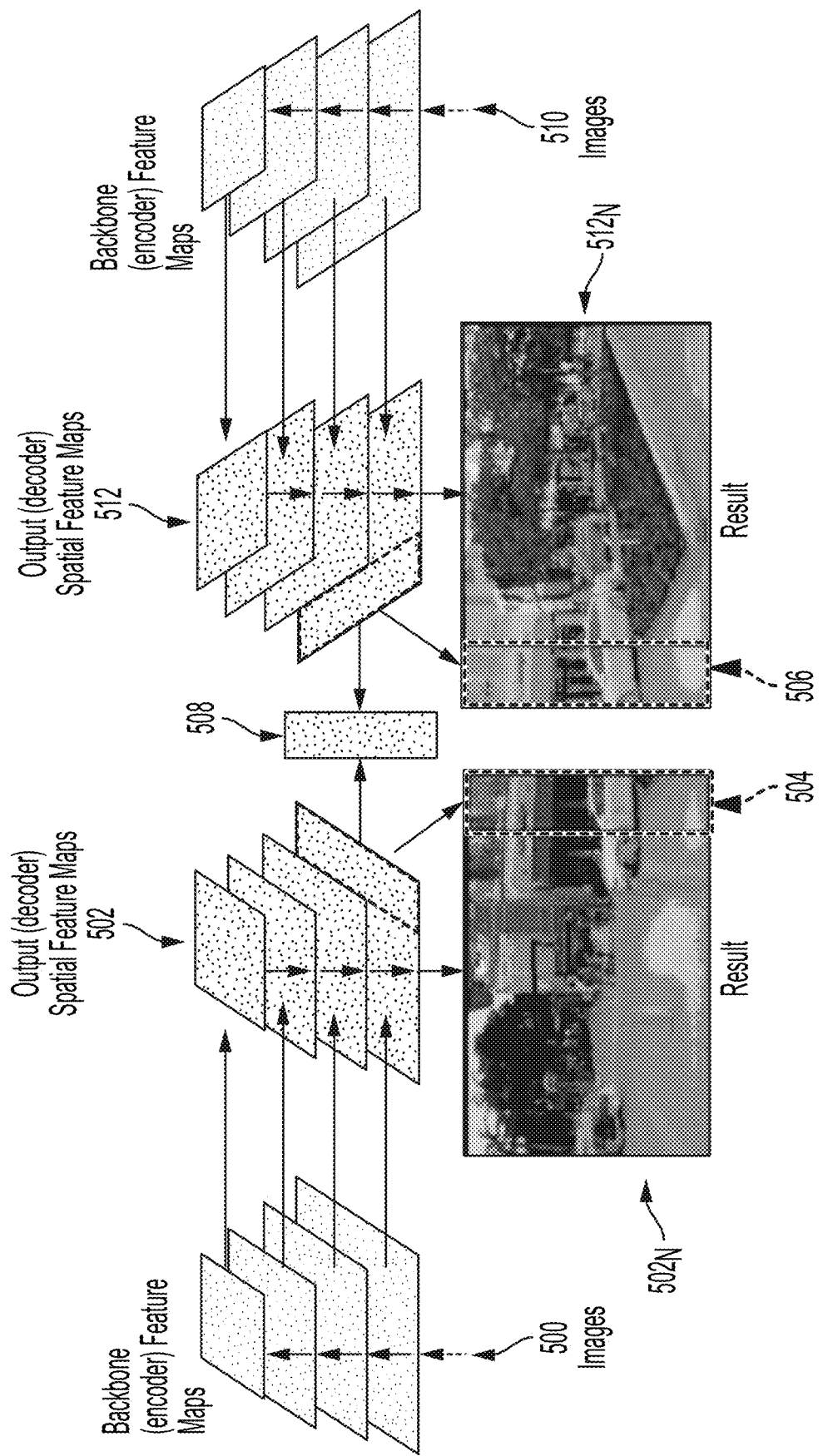
FIG. 5 provides an illustration that is useful for understanding overlapping portions of spatial feature maps used in image-based perception for a task such as semantic segmentation.

In 408, spatial feature maps are generated by the computing device using the images captured in 404. The images can be used in a feature extraction module such as a CNN to generate the spatial feature maps. For example, images 500, 510 of FIG. 5 are input into a CNN to produce output spatial feature maps 502, 512 of FIG. 5. CNNs and spatial feature maps are well known. The CNNs can apply filters or feature detectors to the images to produce the spatial feature maps. For example, a trained CNN takes an RGB image as an input, and optionally outputs one or more predictions such as the class of the 2D image (e.g., a person, a vehicle, a cyclist, a dog, etc.). The class of the image is determined based on learned data patterns during training of the CNN. Each spatial feature map indicates a location and a strength of each detected feature in an image. The features can include, but are not limited to, edges, vertical lines, horizontal lines, bends and/or curves. A certain combination of features in a certain area of an image can indicate that a larger, more complex feature may exists in the image. For example, a spatial feature map could detect a cyclist (e.g., cyclist 114 of FIG. 1) from a combination of line features and circle features in a given area of an image.

In 410, the computing device performs operations to identify overlapping portions of the spatial feature maps. Illustrative overlapping portions 504, 506 of spatial feature maps $502_N$, $512_N$ are shown in FIG. 5. There are different approaches for identifying the overlapping portions of the spatial feature maps. One approach is to consider features of two images to be located in overlapping portions thereof when (i) the features are similar by a certain degree (>70%) and the distance between the predicted output of the two spatial feature maps is less than a threshold value (e.g., a cuboid centroid 10 cm in the x-direction and/or y-direction of the vehicle frame). Another approach is to: use the LiDAR datasets obtained in 406 and/or a depth map to determine a depth of each feature in the spatial feature maps; generate 3D coordinates for each feature in the spatial feature maps using the 2D coordinates of the images (i.e., the x-coordinates and the y-coordinates) and the depths as z-coordinates; and use the 3D coordinates to identify overlapping portions of the spatial feature maps. For example, portions of two spatial feature maps are considered overlapping portions when a distance between 3D coordinates of two features is less than a threshold value.

In 412, the overlapping portions of the spatial feature maps are combined together to form a combined spatial feature map. For example, overlapping portions 504, 506 of spatial feature maps $502_N$, $512_N$ are combined together to form combined spatial feature map 508 of FIG. 5. The overlapping portions of spatial feature maps can be combined by: adding corresponding feature location values together to generate a combined feature location value; and adding the corresponding strength values together to obtain a combined strength value. Alternatively, the computing device can learn weights for fusing the feature location values and/or strength values together via a mathematical equation. The mathematical equation (1) may be defined as follows.

$$L_{combined} = w_1 L_1 + w_2 L_2, \quad (1)$$

wherein $L_{combined}$ represents a combined feature location value, $L_1$ represents a location of a given feature in a first image, $L_2$ represents a location of a corresponding feature in a second image, and $w_1$, $w_2$ represent weights. The weights may be predefined or dynamically determined or selected during 412 in accordance with algorithm(s), rule(s) or condition(s). For example, the weights can be dynamically determined based on relative locations of cameras on the AV, relative FOVs of the cameras that captured the images, and/or conditions of an environment external to an AV (e.g., a sensed amount of light, a sensed amount of rain, etc.). The weights can be computed using the listed information and/or selected from a list of pre-defined weights based on the listed information. Every feature in the combined spatial feature map will have a combined feature value.

In 414, the combined spatial feature map is used to define predictions such as cuboid(s) for each object. Each predicted cuboid comprises an orientated 3D box encompassing features that are associated with a given object. Techniques for defining predicted cuboids from spatial feature maps are well known. One such known technique that can be employed in 414 is using linear regression of the feature's 3D coordinates to learn edges of an object in an image and using the edges to define a predicted 3D cuboidal shape for the object. The predicted 3D cuboidal shape defined for the object is referred to as a predicted cuboid.

In 416, the predicted cuboids are optionally used to control autonomous operations of the vehicle. For example, the predicted cuboids are used to determine a track for the object. The object track can then be used to facilitate generation of a vehicle trajectory which the vehicle is caused to follow. Subsequently, 418 is performed where method 400 ends or other operations are performed.

Figure 6:
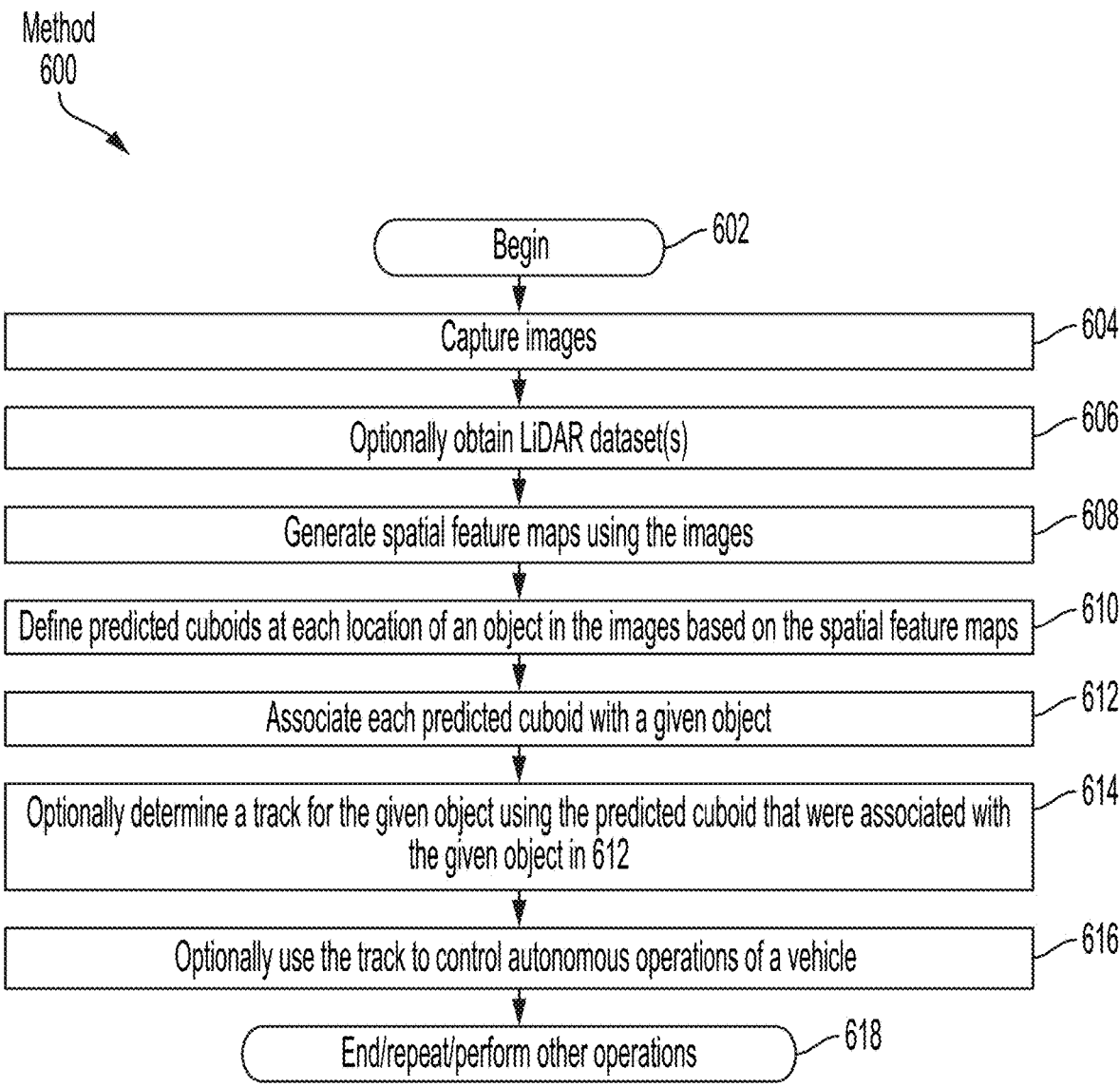
FIG. 6 provides a flow diagram of another illustrative method for image-based perception for tasks such as 3D cuboid prediction.

Referring now to FIG. 6, there is provided a flow diagram of another method 600 for image-based perception. In method 600, machine learning algorithms (such as CNNs) are used to extract features from images. The features are used to predict 3D cuboids for objects in a scene. It can be challenging to determine if two or more cuboid predictions correspond to the same object from different cameras with overlapping FOVs. This is particularly challenging when only a partial view of an object is present in one or more cameras or when the cuboid estimates contain a relatively large amount of noise. Rather than rely solely on the estimated 3D coordinates when associating cuboids from multiple cameras, the present solution uses the machine learning algorithms to output a feature embedding that can be used for object-cuboid associations. This can be done by passing the intermediate features and camera calibration information in the region used for a cuboid's prediction through additional layers of computation (e.g., 2D convolutions and/or fully connected layers).

During training, the intermediate feature embedding output by the network can be passed into a loss function that encourages the embedding to have a small distance to embeddings for the same object from a different view, and a large distance from other objects. This can be accomplished via, for example, a triple loss algorithm.

During interference, the distance between embeddings can be utilized to determine if two cuboid predictions correspond to the same object. Once predictions are associated, the predicted cuboids can be refined into a single cuboid prediction, potentially leveraging intermediate network features.

As shown in FIG. 6, method 600 begins with 602 and continues with 604 where images are captured. The images can be captured by monocular cameras (e.g., cameras 262 of FIG. 2) with overlapping FOVs. The monocular cameras may be deployed on an AV (e.g., AV $102_1$ of FIG. 1). Each image comprises 3 layers (or channels) of information superimposed on each other—a Red (R) layer, a Green (G) layer and a Blue (B) layer. This image may also be referred to as an RGB image. The images can be stored in a datastore local to and/or remote from the AV (e.g., datastore 112 of FIG. 1 and/or memory 312 of FIG. 3).

In 606, LiDAR datasets may optionally be obtained by a computing device (e.g., computing device 110 of FIG. 1 and/or the vehicle on-board computing device 220 of FIG. 2). The LiDAR datasets may be generated by a LiDAR system (e.g., LiDAR system 264 of FIG. 2) of the AV. LiDAR datasets and LiDAR systems are well known.

In 608, spatial feature maps are generated by the computing device using the images captured in 604. The images can be used in, for example, a CNN to generate the spatial feature maps. For example, images 500, 510 of FIG. 5 are input into a CNN to produce output spatial feature maps 502, 512 of FIG. 5. CNNs and spatial feature maps are well known. The CNNs can apply filters or feature detectors to the images to produce the spatial feature maps. For example, a trained CNN takes an RGB image as an input, and optionally outputs the class of the 2D image (e.g., a person, a vehicle, a cyclist, a dog, etc.). The class of the image is determined based on learned data patterns during training of the CNN. Each spatial feature map indicates a location and a strength of each detected feature in an image. The features can include, but are not limited to, edges, vertical lines, horizontal lines, bends and/or curves. A certain combination of features in a certain area of an image can indicate that a larger, more complex feature may exists in the image. For example, a spatial feature map could detect a cyclist (e.g., cyclist 114 of FIG. 1) from a combination of line features and circle features in a given area of an image.

In 610, predicted cuboids are defined at each location of an object in the images based on the spatial feature maps. Each predicted cuboid comprises an orientated 3D box encompassing features that are associated with a given object. Techniques for defining predicted cuboids from spatial feature maps are well known. One such known technique that can be employed in 610 is using linear regression of the feature's 3D coordinates to learn edges of an object in an image and using the edges to define a predicted 3D cuboidal shape for the object. The predicted 3D cuboidal shape defined for the object is referred to as a predicted cuboid. Such known techniques can be used in 610. Additionally or alternatively, operations 410-414 of FIG. 4 can be performed in 610 to define the predicted cuboids.

In 612, each predicted cuboid is associated with a given object. The manner in which this association is made will be discussed in detail below in relation to FIGS. 7-8. Generally, 612 involves determining whether two or more of the predicted cuboids should be associated with a same detected object, and assigning the predicted cuboids to detected objects based on results of the determinations. This assignment can be made, for example, by storing object identifiers in a datastore so as to be associated with the predicted cuboids.

Once the object-cuboid associations have been made, a track for a given object is optionally determined in 614. Techniques for determining object tracks based on predicted cuboids are well known. The object track is then optionally used in 616 to control autonomous operations of a vehicle. For example, the predicted cuboids are used to determine a track for the respective object. The object track can then be used to facilitate generation of a vehicle trajectory which the vehicle is caused to follow. Subsequently, 618 is performed where method 600 ends or other operations are performed.

Figure 7:
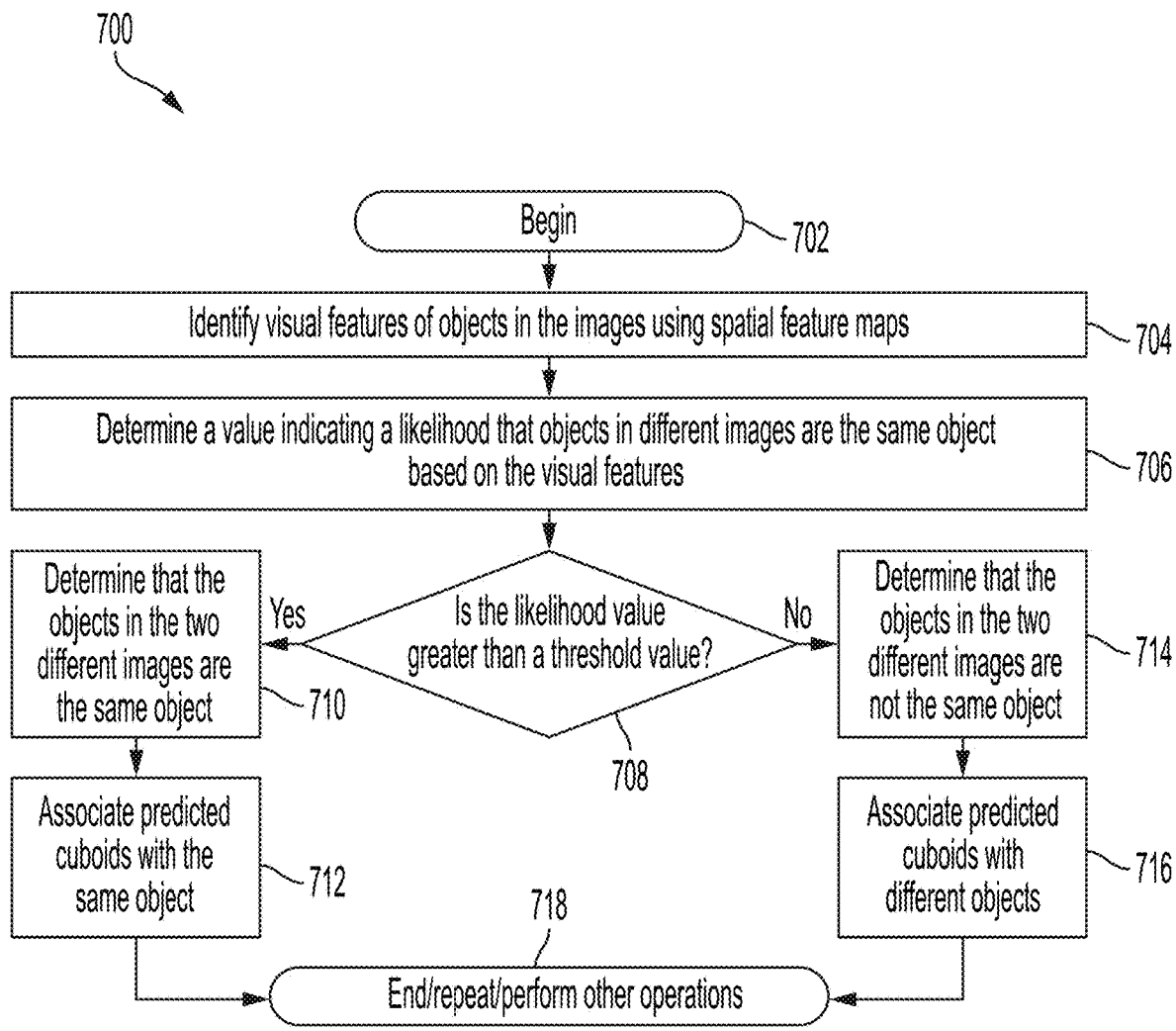
FIG. 7 provides an illustration of a method for associating predicted cuboids with objects.

Referring now to FIG. 7, there is provided a flow diagram of an illustrative method 700 for associating predicted cuboids with objects. The operations of FIG. 7 can be performed in block 612 of FIG. 6. These operations involve identifying visual features of objects in the images using spatial feature maps, as shown by 704. The visual features can include, but are not limited to, color, size and/or shape. Techniques for identifying or otherwise determining visual features for object from spatial feature maps are well known. One such technique that can be used in 704 is a triplet loss algorithm. The triplet loss algorithm generally applies a function (e.g., a 2D convolutional function) pointwise to each point of a spatial feature map included in a predicted cuboid to transform the same to a visual descriptor of what the object is.

Next in 706, a value is determined that indicates a likelihood that objects in different images are the same object based on the visual features. For example, the value can comprise an overall similarity value ranging from 0 to ten, where 0 indicates no similarity and ten indicates the greatest degree of similarity. The overall similarity value can be selected or computed based on the presence of certain visual features (e.g., a similarity value of 10 is selected when the object in a first image and the object in a second image are the same color (e.g., red), have the same overall shape (e.g., a car shape) and/or have the same sequence of symbols on the license plate—a similarity value of 0 is selected when the objects do not have the same color, shape and/or sequence of symbols). In some scenarios, one is added to a score for each visual feature of the objects that is the same. So, if there are ten visual features under consideration, the overall similarity value can be zero when the objects have no similar visual feature, one when the objects have one similar visual feature, two when the objects have two similar visual features, etc. The present solution is not limited in this regard.

If the likelihood value is greater than a threshold value [708:YES], then method 700 continues with 710 where the computing device makes a determination that the objects in the two images are the same object. The computing device also performs operations in 712 to associate the corresponding predicted cuboids with the same object. Subsequently, 718 is performed where method 700 ends or other operations are performed.

In contrast, if the likelihood value is less than or equal to the threshold value [708:NO], then method 700 continues with 714 where the computing device makes a determination that the objects in the two images are different objects. The computing device also performs operations in 716 to associate the corresponding predicted cuboids with different objects. Subsequently, 718 is performed where method 700 ends or other operations are performed.

Figure 8:
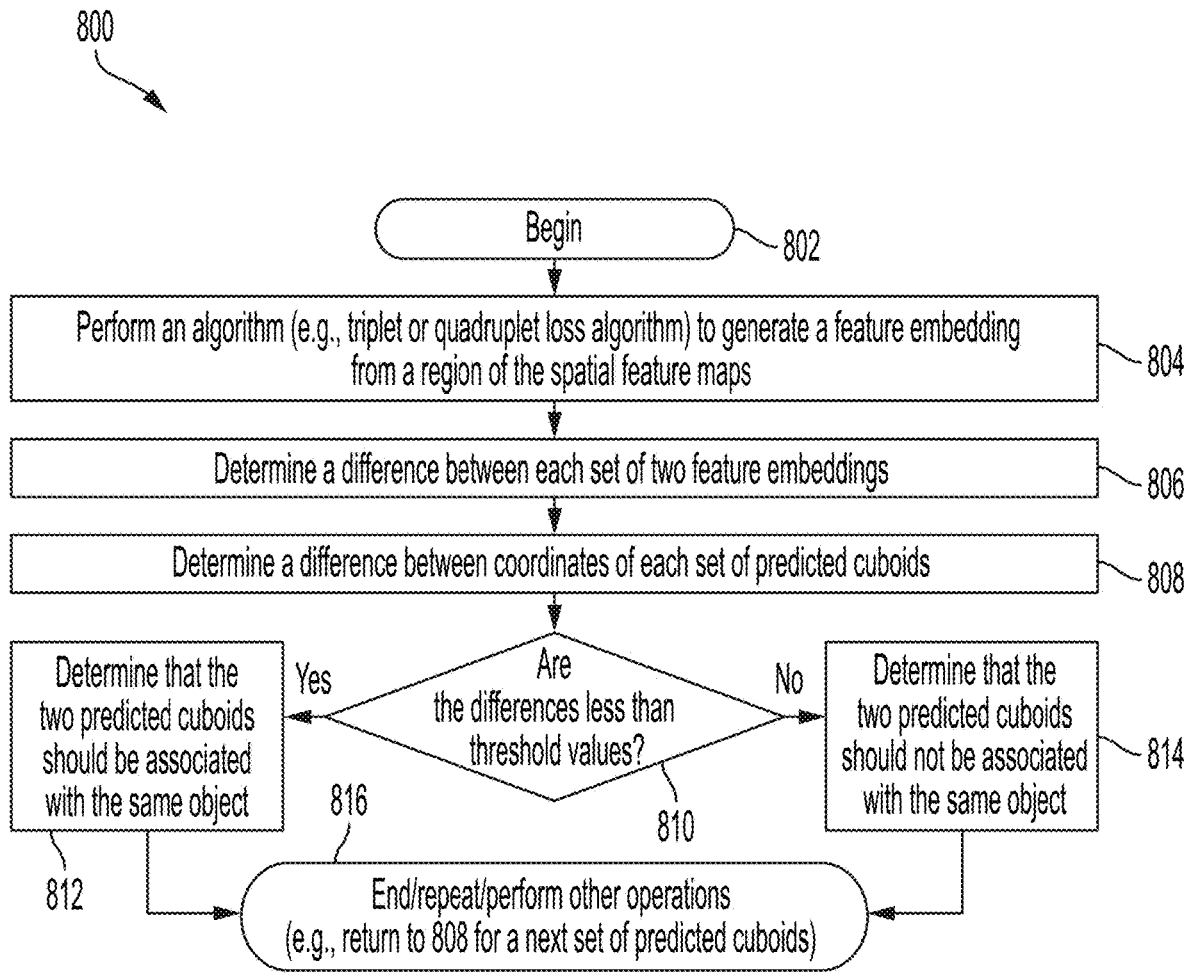
FIG. 8 provides an illustration of another method for associating predicted cuboids with objects.
Figure 9:
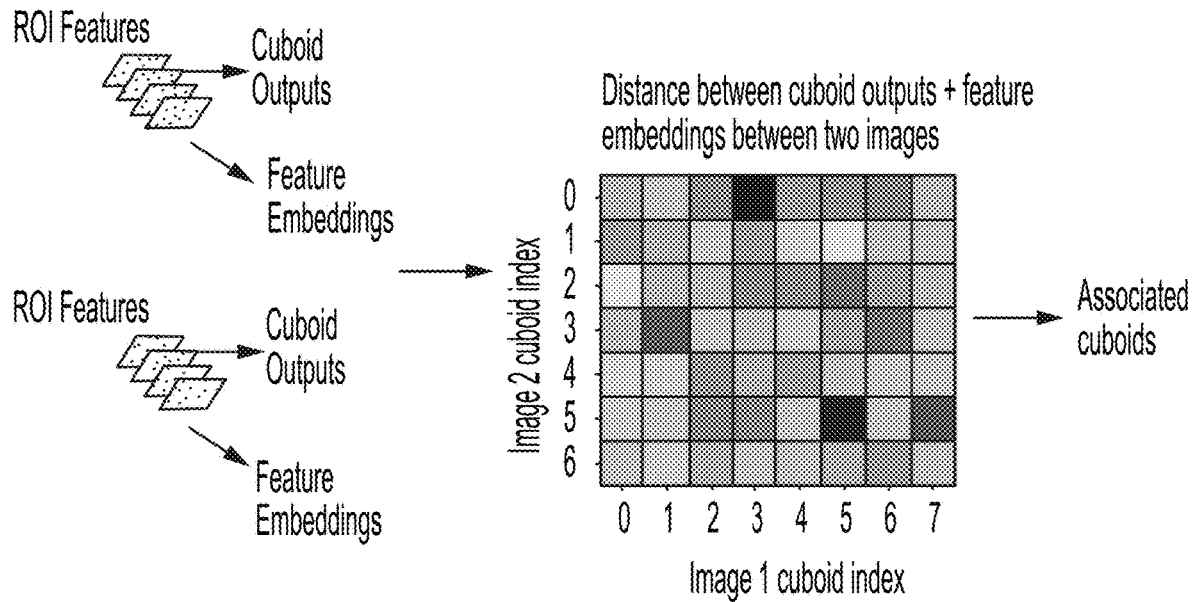
FIG. 9 provides an illustration that is useful for understanding how predicted cuboids are associated with objects.
Figure 10:
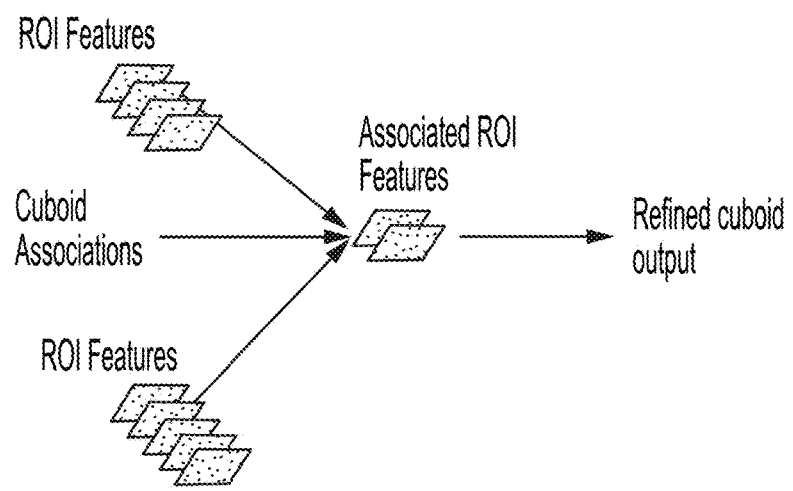
FIG. 10 provides an illustration that is useful for understanding how predicted cuboids can be used to generate refined cuboids.

Referring now to FIG. 8, there is provided a flow diagram of an illustrative method 800 for associating predicted cuboids with objects. The operations of FIG. 8 can be performed in block 612 of FIG. 6.

Method 800 begins with 802 and continues with 804 where a feature embedding is generated from the region of the spatial feature maps for each predicted cuboid. The parameters for generating these feature embeddings can be learned via, for example, a triplet or quadruplet loss algorithm. The embeddings are used in 806 to obtain values for the visual features of each object in the images. These visual feature values are compared to each other to determine whether they are the same as each other by a certain amount or degree (e.g., 70% or the difference between two visual feature values is less than a threshold value). The generation of an additional embedding trained with, for example, a triplet loss algorithm addresses different angles of the objects and any occlusion of the objects. The feature embedding can be generated by applying a function (e.g., a 2D convolution function) point-wise to each point of the spatial feature map included in the predicted cuboid so as to transform the same to a data point feature embedding (e.g., visual descriptor of what the object is). Thus, the term "feature embedding" as used herein refers to a vector representation of visual and spatial features extracted from an image.

Triplet loss algorithms are well known. The triplet loss function is a machine learning algorithm where, during training, a baseline input is compared to a positive input and a negative input. The distance from the baseline input to the positive input is minimized, and the distance from the baseline input to the negative input is maximized. The triplet loss algorithm can be described using a Euclidean distance function as shown by the following mathematical equation (2).

$$\mathcal{L}(A,P,N) = \max(\|f(A)-f(P)\|^2 - \|f(A)-f(N)\|^2 + \alpha, 0) \quad (2)$$

where A is an achor input, P is a positive input of a same class as A, N is a negative input of a different class as A, $\alpha$ is a margin between positive and negative pairs, and f is a feature embedding.

Next in 806, the computing device determines a difference between each set of two feature embeddings. For example, an L1 or L2 distance function can be used to determine this difference. The L1 distance function may be defined by the following mathematical equation (3).

$$L1 = \sum_{i=1}^{n} |y_{true} - y_{predicted}| \quad (3)$$

where L1 represents results from performing the L1 distance function, $y_1$ represents an embedding derived from one feature map, $y_2$ represents an embedding derived from a second feature map, and n represents an integer greater than 1. The L2 distance function may be defined by the following mathematical equation (4).

$$L2 = \sum_{i=1}^{n} (y_{true} - y_{predicted})^2 \quad (4)$$

where L2 represents results from performing the L2 distance function.

The computing device also determines a difference between coordinates of each set of predicted cuboids, as shown by 808. Methods for determining differences between coordinate are well known. If the differences are less than respective threshold values [810:YES], then method 800 continues with 812 where a determination is made that the predicted cuboids should be associated with the same object. If the differences are less than the respective threshold values [810:NO], then method 800 continues with 814 where a determination is made that the predicted cuboids should not be associated with the same object. Subsequently, 816 is performed where method 800 ends or other operations are performed (e.g., return to 808 for a next set of predicted cuboids).

Figure 11:
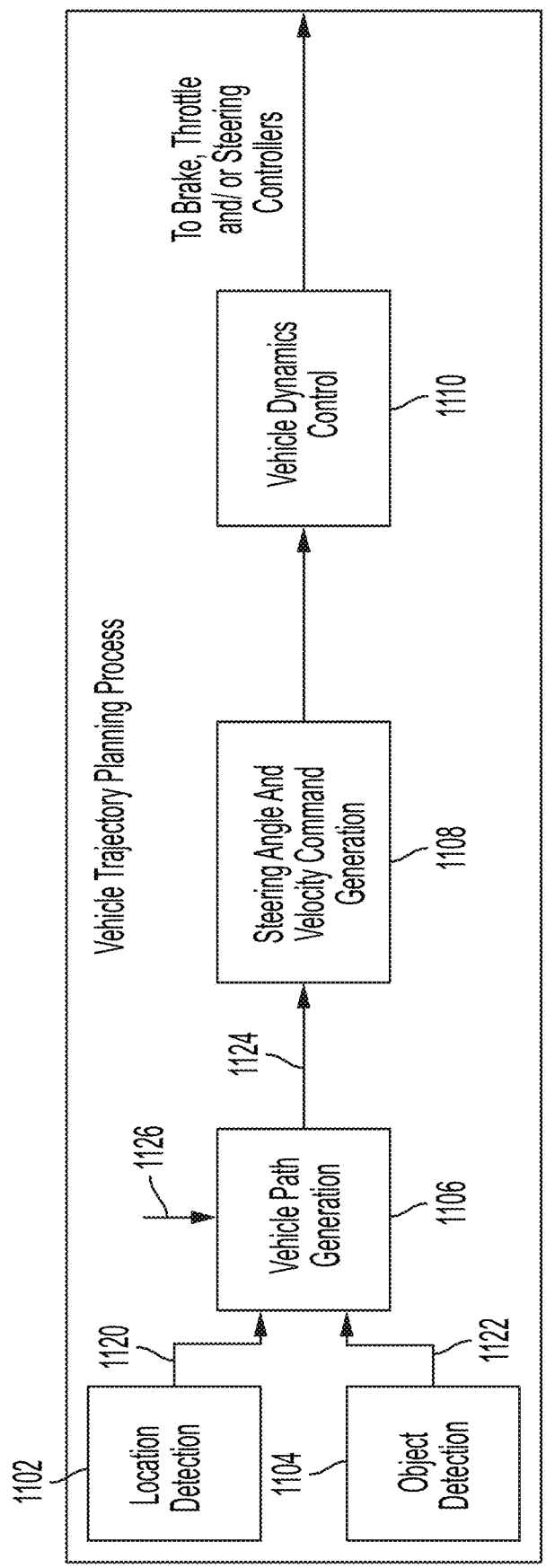
FIG. 11 provides a block diagram that is useful for understanding how a vehicle is controlled in accordance with the present solution.

The predictions (e.g., cuboids) generated during methods 400, 600, 700 and/or 800 can be used by an AV for object trajectory prediction, general scene understanding, vehicle trajectory generation, and/or collision avoidance. A block diagram is provided in FIG. 11 that is useful for understanding how vehicle control is achieved in accordance with the object related information estimated based on the modified image. All or some of the operations performed in FIG. 11 can be performed by the on-board computing device of a vehicle (e.g., AV 102₁ of FIG. 1) and/or a remote computing device (e.g., computing device 110 of FIG. 1).

In block 1102, a location of the vehicle is detected. This detection can be made based on sensor data output from a location sensor (e.g., location sensor 260 of FIG. 2) of the vehicle. This sensor data can include, but is not limited to, GPS data. Information 1120 specifying the detected location of the vehicle is then passed to block 1106.

In block 1104, an object is detected within proximity of the vehicle. This detection is made based on sensor data output from a camera (e.g., camera 262 of FIG. 2) of the vehicle and/or LiDAR datasets generated by a LiDAR system (e.g., LiDAR system 264 of FIG. 2) of the vehicle. The manner in which the image-based perception is achieved was discussed above in relation to FIGS. 4-10. Image-based perception information 1122 about the detected object is passed to block 1106. This information includes, but is not limited to, cuboid information (e.g., a position of an object, an orientation of the object, and a spatial extent of the object), an initial predicted trajectory of the object, a speed of the object, and/or a classification of the object. The initial predicted object trajectory can include, but is not limited to, a linear path pointing in the heading direction of the object.

In block 1106, a vehicle trajectory is generated using the information from blocks 1102 and 1104. Techniques for determining a vehicle trajectory are well known in the art. Any known or to be known technique for determining a vehicle trajectory can be used herein without limitation. For example, in some scenarios, such a technique involves determining a trajectory for the AV that would pass the object when the object is in front of the AV, the object has a heading direction that is aligned with the direction in which the AV is moving, and the object has a length that is greater than a threshold value. The present solution is not limited to the particulars of this scenario. The vehicle trajectory 1124 can be determined based on the information 1120, the image-based perception information 1122, and/or a road map 1126 which is pre-stored in a datastore of the vehicle. The vehicle trajectory 1124 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 1124 is then provided to block 1108.

In block 1108, a steering angle and velocity command is generated based on the vehicle trajectory 1124. The steering angle and velocity command are provided to block 1110 for vehicle dynamics control.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for image-based perception, comprising:
   obtaining, by a computing device, images captured by a plurality of cameras with overlapping fields of view;
   generating, by the computing device, spatial feature maps indicating locations of features in the images;
   defining, by the computing device, predicted cuboids at each location of an object in the images based on the spatial feature maps;
   generating feature embeddings by applying a function point-wise to each point of the spatial feature maps included in the predicted cuboids, each of the feature embeddings comprising a vector representation of visual and spatial features extracted from the images;
   obtaining a first difference between each set of two said feature embeddings and a second difference between coordinates of each set of two said predicted cuboids; and
   assigning, by the computing device, at least two cuboids of said predicted cuboids to a same object or different objects based on the first and second differences.

2. The method according to claim 1, wherein the spatial feature maps are generated using a feature extraction algorithm.

3. The method according to claim 1, wherein said function comprises a triplet or quadruplet loss algorithm.

4. The method according to claim 1, wherein the function comprises a 2D convolutional function configured to transform each said point of the spatial feature maps to a visual object descriptor.

5. The method according to claim 4, wherein at least one of said features comprises an edge, a vertical line, a horizontal line, a bend or a curve further comprising.

6. The method according to claim 1, wherein said assigning further comprises comparing the first and second difference respectively to threshold values.

7. The method according to claim 6, wherein the at least two cuboids of the predicted cuboids are assigned to the same object when the first and second differences are respectively less than threshold values.

8. The method according to claim 6, wherein the at least two cuboids of the predicted cuboids are assigned to different objects when at least one of the first and second differences is greater than a respective one of threshold values.

9. The method according to claim 1, further comprising using the predicted cuboids that were associated with the same object to generate a track.

10. The method according to claim 9, further comprising using the track to control autonomous operations of a vehicle.

11. A system, comprising:
   a processor;
   a non-transitory computer-readable storage medium comprising programming instructions that are configured to cause the processor to implement a method for image-based perception, wherein the programming instructions comprise instructions to:
   obtain images captured by a plurality of cameras with overlapping fields of view;
   generate spatial feature maps indicating locations of features in the images;
   define predicted cuboids at each location of an object in the images based on the spatial feature maps;
   generate feature embeddings by applying a function point-wise to each point of the spatial feature maps included in the predicted cuboids, each of the feature embeddings comprising a vector representation of visual and spatial features extracted from the images;
   obtaining a first difference between each set of two said feature embeddings and a second different between coordinates of each set of two said predicted cuboids; and
   assign at least two cuboids of said predicted cuboids to a same object or different objects based on the first and second differences.

12. The system according to claim 11, wherein the spatial feature maps are generated using a feature extraction module.

13. The system according to claim 11, wherein the function comprises a triplet or quadruplet loss function.

14. The system according to claim 13, wherein the function comprises a 2D convolutional function configured to transform each said point of the spatial feature maps to a visual object descriptor.

15. The system according to claim 14, wherein at least one of said features comprises an edge, a vertical line, a horizontal line, a bend or a curve.

16. The system according to claim 11, wherein the programing instructions further comprise instructions to compare the first and second difference respectively to threshold values.

17. The system according to claim 16, wherein the at least two cuboids of the predicted cuboids are assigned to the same object when the first and second differences are respectively less than threshold values.

18. The system according to claim 16, wherein the at least two cuboids of the predicted cuboids are assigned to different objects when at least one of the first and second differences is greater than a respective one of threshold values.

19. The system according to claim 11, wherein the programing instruction further comprising instructions to determine a track for the object using the predicted cuboids that were associated with the same object, and cause the track to be used to control autonomous operations of a vehicle.

20. A computer program product comprising a memory and programming instructions that are configured to cause a processor to:

obtain images captured by a plurality of cameras with overlapping fields of view;

generate spatial feature maps indicating locations of features in the images;

define predicted cuboids at each location of an object in the images based on the spatial feature maps;

generate feature embeddings by applying a function point-wise to each point of the spatial feature maps included in the predicted cuboids, each of the feature embeddings comprising a vector representation of visual and spatial features extracted from the images;

obtain a first difference between each set of two said feature embeddings and a second difference between coordinates of each set of two said predicted cuboids; and assign at least two cuboids of said predicted cuboids to a same object or different objects based on the first and second differences.

* * * * *